United States Patent [19]

Backes et al.

[11] Patent Number: 5,231,693
[45] Date of Patent: Jul. 27, 1993

[54] TELEROBOT CONTROL SYSTEM

[75] Inventors: Paul G. Backes, La Crescenta; Kam S. Tso, Los Angeles, both of Calif.

[73] Assignee: The United States of America as represented by the Administrator, National Aeronautics and Space Administration, Washington, D.C.

[21] Appl. No.: 699,299

[22] Filed: May 9, 1991

[51] Int. Cl.$^5$ .................... G06F 15/00; G06F 15/46; G05B 19/24
[52] U.S. Cl. ...................... 395/99; 395/84; 395/905; 318/568.1
[58] Field of Search .......... 395/84, 99, 905; 318/568.1, 573

[56] References Cited

U.S. PATENT DOCUMENTS

| | | | |
|---|---|---|---|
| 4,224,501 | 9/1980 | Lindbom et al. | 318/568.13 |
| 4,578,562 | 3/1986 | Lindström et al. | 395/99 |
| 4,831,531 | 5/1989 | Adams et al. | 395/99 |
| 4,837,734 | 6/1989 | Ichikawa et al. | 345/84 |
| 4,920,500 | 4/1990 | Hetland et al. | 395/86 |
| 4,942,538 | 7/1990 | Yuan et al. | 395/94 |
| 4,943,933 | 7/1990 | Miyamoto et al. | 395/54 |
| 4,947,314 | 8/1990 | Sumida | 395/94 |
| 5,038,089 | 8/1991 | Szakaly | 318/573 |
| 5,046,022 | 9/1991 | Conway et al. | 395/99 |
| 5,047,700 | 9/1991 | Szakaly | 318/568.1 |

OTHER PUBLICATIONS

Paul G. Backes, Kam S. Tso, "UMI: An Interactive Supervisory and Shared Control System for Telerobotics", *Proceedings of The 1990 IEEE International Conference on Robotics and Automation*, May 13-18, 1990, pp. 1096-1101.

"Telerobotics", Sheridan et al., Plenary presentation for 10th IFAC World Congress on Automatic Control, Jul. 27-31, 1987, Munich.

"Robot Simulator in Tips/Geometric Simulator", Okino et al., Robotics & Computer-Integrated Manufacturing, 1987, printed in Great Britain.

"The Space Perspective: Man-Machine Redundancy in Remote Manipulator Systems" Montemerlo et al., Jun.-/Jul. 1988.

"Robot Tasic planning Based on Product Modeling" Kawabe et al., IEEE 1985.

Bekey et al., "Computer Control of Space-Borne Teleoperators With Sensory Feedback", Proceed. of the 1985 IEEE Int. Conf. on Robotics and Autom.

Primary Examiner—Allen R. MacDonald
Assistant Examiner—George Davis
Attorney, Agent, or Firm—John H. Kusmiss; Thomas H. Jones; Guy M. Miller

[57] ABSTRACT

A telerobot system including an operator interface for developing and controlling complex tasks for execution on a remote robot manipulator by developing sequences of parameterized tasks primitives for execution and testing on a local simulator. The task sequences, and their parameterization, may be interactively modified by teleoperation and/or editing during sequence development and task execution. Adjustable time delays are provided for execution simulation including delays expected to occur between task command and execution at the remote robot manipulator.

7 Claims, 1 Drawing Sheet

TELEROBOT CONTROL SYSTEM

ORIGIN OF THE INVENTION

The invention described herein was made in the performance of work under a NASA contract, and is subject to the provisions of Public Law 96-517 (35 USC 202) in which the Contractor has elected not to retain title.

1. Technical Field

The present invention relates to robotic control systems and, in particular, to telerobot systems for use in poorly modeled environments, such as those encountered in space and undersea projects.

2. Background of the Invention

Techniques for the operation and control of robotic manipulators in well modeled environments, such as manufacturing facilities, have been developed and used very successfully for many years. Such environments may be well modeled because the environment of the robotic work area can be well known or designed to minimize differences between the actual work area and the model used by the operation and control techniques.

These techniques must be substantially modified for use in poorly modeled environments, or to perform tasks in response to unplanned scenarios and when there is a potentially substantial time delay between teleoperation inputs and task execution as occurs for example in surface controlled undersea and ground controlled space robotic operations.

Remote control of robotic operation may be accomplished by teleoperation, autonomous or supervisory control as well as a combination of these approaches which is known as shared control.

Interactive robotic task planning, execution and monitoring can be accomplished with pure teleoperation. In this approach, planning resides within the operator's mind, execution is issued by the operator via hand controllers and monitoring is provided by sensory feedback to the operator. Autonomous task planning, execution, and monitoring is the other extreme to teleoperation. Here, the operator initiates only very high level commands such as "replace the electronics module" and planning, execution, and monitoring is then done autonomously without further operator input.

Teleoperation has proven to be a valuable tool for many tasks especially in unmodeled or poorly modeled environments and for unplanned scenarios. The increasing complexity of the tasks to be performed places an ever increasing burden on the operator. Autonomous control is becoming increasingly valuable as a tool to relieve the operator of many task planning, execution, and monitoring responsibilities in order to allow the operator to concentrate on the more crucial elements of a task.

Supervisory and shared control are recent improvements in telerobot task execution for unplanned scenarios, or for poorly modeled environments. Supervisory control is where the operator selects execution parameters for autonomous execution of a task and can stop execution at any time. Shared control is the mixing of inputs from an operator and an autonomous control system during task execution.

A key element needed for planning, execution, and monitoring in a supervisory or shared control system is an operator interface which supports shared and supervisory control features. Supervisory features are required to permit the operator to set up teleoperation, autonomous, and shared control task environment parameters and to provide specific input parameters for autonomous task primitives and teleoperation control. A task primitive is a reusable, predetermined, self contained, preprogrammed program for controlling a robot to accomplish a task, such control being dependent upon a set of input parameters which may be designated before or at the time of task execution. Shared features of an operator interface are required in order to provide autonomous setting of some environment and control parameters depending upon task context.

What is needed is an operator interface for planning, execution and monitoring of telerobot tasks in poorly modeled environments and for unplanned scenarios which efficiently and conveniently combines teleoperation, autonomous, supervisory, and shared control techniques.

BRIEF STATEMENT OF THE INVENTION

The preceding and other shortcomings of the prior art are addressed and overcome by the present invention that provides, in a first aspect, a method for controlling a telerobot by providing a set of task primitives to control a local telerobot simulator and a remote telerobot manipulator, interactively developing and modifying the sequencing and parameterization of a sequence of said task primitives executed on the local telerobot simulator, and then executing the sequence to control the remote telerobot manipulator.

These and other features and advantages of this invention will become further apparent from the detailed description that follows which is accompanied by a set of drawing figure(s). In the figures and description, numerals indicate the various features of the invention, like numerals referring to like features throughout both the drawings and the description.

BRIEF DESCRIPTION OF THE DRAWING(S)

FIG. 1 is a block diagram schematic of a telerobot control system including an operator interface according to the present invention.

DETAILED DESCRIPTION OF THE INVENTION

Figure 1:
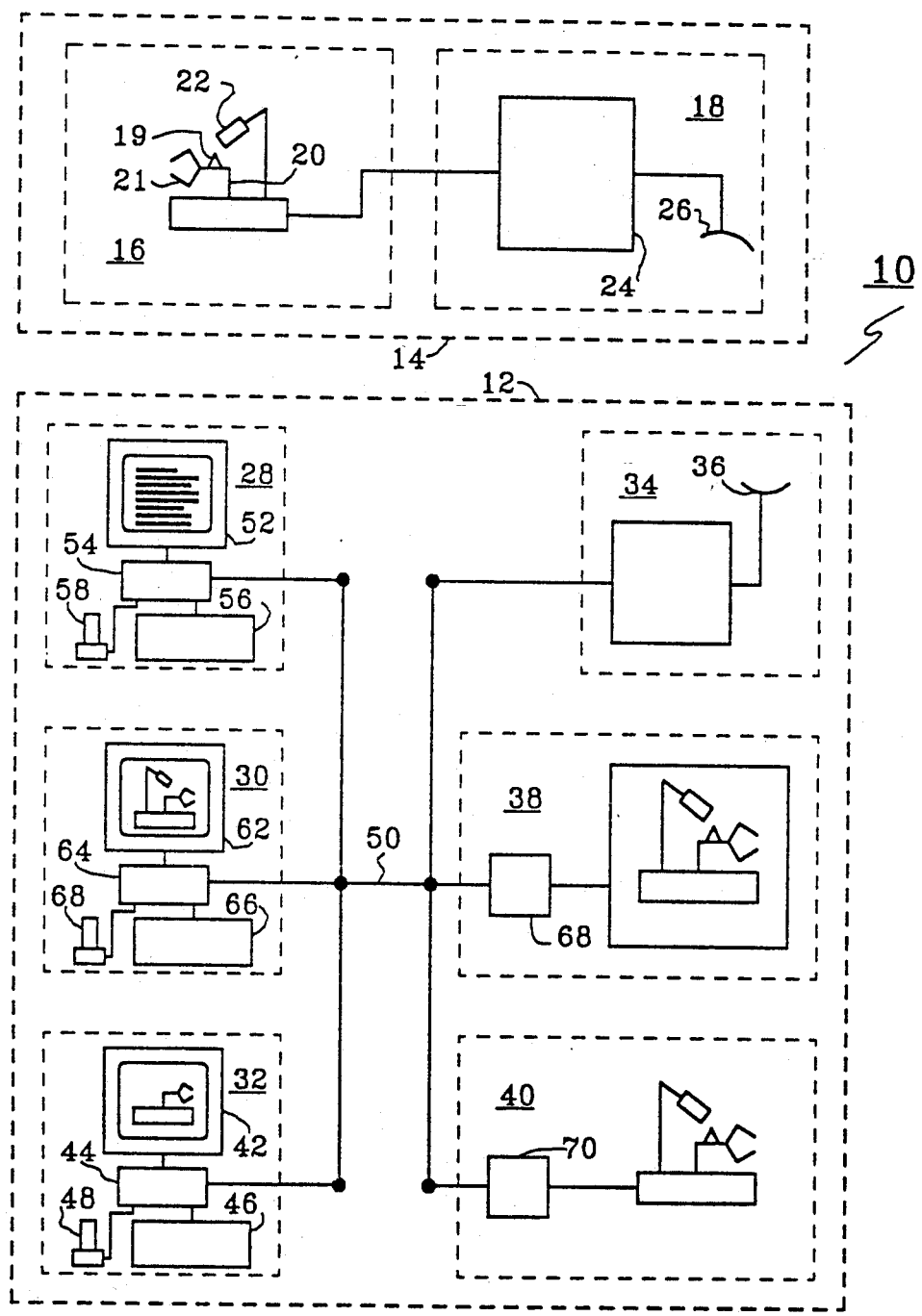

Referring now to FIG. 1, telerobot control system 10 includes operator interface 12 and remote task execution system 14.

Remote task execution system 14 includes robot manipulator 16, suitable for the tasks to be performed, and communication link 18 for providing bidirectional communication with operator interface 12. Robot manipulator 16 includes one or more remotely controllable devices such as robot arm 20, end effector 21 and remote sensors, such as force-torque sensor 19 and video camera 22. Communication link 18 includes communication and control system processor 24 as well as a suitable linkage device, such as antenna 26.

Operator interface 12 includes one or more operator terminals, such as setup, simulation and execution terminals 28, 30, and 32. It may be convenient to provide separate terminals for these tasks as shown, or combine the terminals into a single type of multipurpose terminal for each operator, capable of performing all required functions.

Operator interface 12 also includes operator interface communication processor 34, including a suitable linkage device such as antenna 36, as well as graphics simulator 38 and local robot manipulator 40 which will be described below in greater detail.

Each operator terminal, such as execution terminal 32, includes monitor 42, central processor 44, keyboard entry device 46, and a hand control and feedback device, such as hand controller 42. During the various operations performed at the operator terminals, the operator enters information into the appropriate terminal via keyboard entry device 46 and/or hand controller 42 and receives information from remote task execution system 14, graphics simulator 38, and/or local robot manipulator 40 via monitor 42 and/or hand controller 48, as appropriate to the task.

All the devices in operator interface 12 are interconnected by a conventional interconnection system, designated generally as interconnection system 50.

Telerobot control system 10 is operable in a conventional telerobot control mode in which pure teleoperation control is employed. During such operation, an operator working at execution terminal 32 is directly connected in real time, or near real time, to remote task execution system 14 via operator interface communication processor 34. Commands entered via keyboard entry device 46 and/or hand controller 48 are implemented by robot manipulator 16 while information is made available to the operator from remote sensors, such as force-torque sensor 19 and/or video camera 22, via monitor 42 and/or hand controller 48.

Telerobot control system 10 is operable in a conventional autonomous mode in which autonomous control is employed. During such control, the operator applies an input to execution terminal 32 to cause the execution of a preprogrammed task by robot manipulator 16. The input is applied by interconnection system 50 and operator interface communication processor 34 to communication link 18 which initiates the execution of the preprogrammed task within communication and control system processor 24 by robot manipulator 16. Some information relating to the status of the task and robot manipulator 16 may be collected by sensors, such as video camera 22, and communication and control system processor 24 and be provided to the operator by monitor 42.

Telerobot control system 10 is operable in a conventional supervisory mode in which autonomous task execution is initiated by the operator by the provision of the appropriate parameters to communication and control system processor 24 via keyboard entry device 46 and/or hand controller 48. The preprogrammed task within communication and control system processor 24 initiated in this mode may be in the form of a task primitive, as described above, which requires the provision of a set of input parameters. These parameters may be modified during execution.

Remote task execution system 14, in addition to a set of task primitives, includes an executive program similar to executives within graphics simulator 38 and local robot manipulator 40. These executives control one or more central processing units, or CPU's, within remote task execution system 14 and/or operator interface 12, which sequentially call, operate and execute task primitives, provide status and sensor feedback to operator interface 12 and run other programs, in sequence or in parallel with the task primitives, such as embedded safety and monitoring programs. The executive also maintains and uses a database of global parameters which are normally changed less frequently than the parameters provided to a task primitive would be changed.

The use of a set of task primitives common to operator interface 12 and remote task execution system 14 permit the interactive development and control of the operation of tasks by robot manipulator 16 by passing only parameters and teleoperation inputs between operator interface 12 and remote task execution system 14. Control of remote task execution system 14 by parametrization which may be developed and tested at a local site before being applied to remote task execution system 14 permits a relative wide range of operation of robot manipulator 16 without the transmission of new programming from the local to the remote site. The sequence of parameterized task primitives may be sequenced or stepped through using the executive in operator interface 12 or in remote task execution system 14.

A simple preprogrammed task to change the angular position of an end effector or other robot device may be configured as a task primitive. For example, it would be well within the skill of a person of ordinary skill in this art to prepare a program, or task primitive, to adjust the angular position of video camera 22 in accordance with the absolute or relative value of an angular position provided by the operator. During execution of this task primitive by telerobot control system 10, the operator would initiate this task and provide the required angular position information via execution terminal 32 to communication and control system processor 24.

Video camera 22 would then be caused to change position in accordance with the task primitive in communication and control system processor 24 to the angular position specified by the operator input. Information concerning the execution of this task, as well as information concerning the position of video camera 22 as detected by appropriate sensors, is then made available to the operator via execution terminal 32.

Telerobot control system 10 is operable in a shared control mode in which teleoperated inputs are merged during task execution with inputs from autonomous task primitives. Execution of shared control is initiated by the operator by provision of the appropriate parameters to communication and control system processor 24 via keyboard entry device 46 and/or hand controller 48. The preprogrammed task primitive within communication and control system processor 24 is then provided with additional inputs from the operator during execution of the task.

An example of shared control is the task of cleaning or polishing a surface where the robot manipulator manipulates a cleaning or polishing tool over the surface. Although the operator may be required to make decisions concerning where and when to move the polishing tool along the surface, it is important to control the force applied by the tool against the surface even if improperly specified by the operator.

Under shared control, the location of the polishing tool on the surface, that is, along the X and Y axes or degrees of freedom (DOF's) which define the plane tangent to the surface, as well as rotation of the tool about an axis perpendicular to the surface, is specified by the operator by teleoperation. The Z axis or DOF tangent to the surface, as well as tilting of the polishing tool, is under autonomous control to automatically maintain the preselected force applied by the tool and maintain the tool tangent to the surface. In this manner, the polishing may be safely accomplished by the operator and any accidental or mistaken intended motion indicated by the teleoperator along the Z axis, or tilting motion of the XY plane, which might apply sufficient forces to damage the surface, will be ignored by the autonomous system controlling the actual robot motion.

Another example of shared control is the teleoperation of robot arm 20 to move toward an object during operation of a task primitive providing guarded motion. A guarded motion primitive permits motion until a predetermined limit is reached, such as the surface of the object towards which robot arm 20 is moved. A position sensor, not shown, would provide position information to communication and control system processor 24 indicative of the relative position between robot arm 20 and the surface limit.

Upon initiation of such shared control operation, the operator parameterizes the task primitive by providing parameter inputs thereto, including the selection of the surface of the object as the limit and a safety zone or guard band, if required. Actual motion of robot arm 20 toward the object is initiated and maintained by the operator via activation of hand controller 48. If the motion indicated by such activation of hand controller 48 moves robot arm 20 so that its position approaches the surface, or guard band, provided by the parameterized task primitive, autonomous control in accordance with the task primitive is merged with teleoperation to stop motion of robot arm 20 at the preselected position limit.

Task primitives under supervisory and/or shared control may be selected in a predetermined sequence to create more complex tasks. A guarded motion primitive may conveniently be followed by a compliant motion primitive controlling the grasp of end effector 21 mounted on robot arm 20 to create a more complex task, called reach and grasp herein, during execution of which robot arm 20 is moved to the surface of an object which is then grasped by end effector 21.

A compliant motion primitive for controlling the grasp of end effector 21 could, for example, be used to adjust the position of end effector 21 to control the contact forces while closing the end effector gripper fingers. Sensory feedback provides information concerning the contact forces and torques while parameterization of the compliant motion task primitive sets the control parameters.

Supervisory control to move robot manipulator 16 to reach and grasp an object in accordance with this sequence requires selection of the individual task primitives, their sequencing, and parameterization of each such task. Shared control while executing this group of tasks permits the addition of further teleoperation input by the operator during execution of the task.

Shared control with task primitive sequencing permits the execution of complex tasks, such as reach and grasp, in response to unplanned scenarios and/or in poorly modeled environments, based on combinations of teleoperation with a group of preprogrammed, generalized task primitives, such as guarded and compliant motion.

Telerobot control system 10 is specifically configured for the convenient development, testing, and execution of complex tasks under supervisory and/or shared control based on a preprogrammed set of less complex task primitives.

The development of task primitives, and/or the development of more complex tasks based on sequencing of less complex task primitives, will be described next with reference to setup terminal 28, shown in FIG. 1.

As noted above, setup terminal 28 may conveniently be combined with execution terminal 32 and, for the purposes of this description of the development of a complex task, will be considered to be identical therewith. Such terminals are provided with access to a set of task primitives equal to, or at least related to, those contained in remote task execution system 14.

Development of a complex task from the sequencing of a series of less complex task primitives may be accomplished in telerobot control system 10 interactively, using either teleoperation and/or editing to provide appropriate parameterization.

In the simplest case, the editing mode may be used to create or modify a script for the complex reach and grasp task by combining the individual movement and grasping task primitives described above, with appropriate parameterization, to create the equivalent of a new preprogrammed task.

In this case, the operator using setup terminal 28 interactively enters data via keyboard entry device 56 to combine portions of preexisting text within central processor 54, as displayed on monitor 52, and/or modify default and/or previously modified parameters.

Alternatively, the reach and grasp task may be developed for a particular scenario by modifying parameterization by teleoperation of local robot manipulator 40 and/or local graphics simulator 38 by setup terminal 28. Central processor 54 must of course include at least portions of the task primitives to be used, such as guarded and compliant motion.

In the preferred embodiment of the present invention, adjustment or modification of the default or previously modified parameterization of these primitives is accomplished interactively by the operator by both entry of data via keyboard entry device 56 and teleoperation via hand controller 48 as well as autonomously based on task context by, for example, run-time binding as will be discussed below in greater detail. Feedback of the operation of local robot manipulator 40 in response to the developed task may be provided by the appropriate sensors, similar to force-torque sensor 19 and associated with local robot manipulator 40 and/or setup terminal 28.

The development of such complex tasks by sequencing and altering of task primitives combined with manual teleoperation may be substantially enhanced by combining the text mode with a learning mode. A development of a complex task of this type will be depicted with regard to simulation terminal 30 which is used to create a simulation of a task based on a new scenario. For safety, convenience, speed, and/or similar requirements, this complex task is first simulated on graphics simulator 38 which provides a computer aided graphical simulation of the expected operation of robot manipulator 16. The task may then be simulated on local robot manipulator 40.

During operation of simulation terminal 32, previously prepared textual development of program tasks or sequences of task primitives are combined with teleoperation to define a more complex task. As a simple example, the operator may choose to have simulation terminal 30 operate in a learning mode to remember a starting position for robot arm 20 as a preliminary step before execution of the reach and grasp task compiled from a sequence of preprogrammed task primitives. The remembered combination of the starting position, reach and grasp then becomes a new task primitive or macro which itself is then simulated and tested using graphics simulator 38 and/or local robot manipulator 40 and further developed in the textual and learning mode by the operator.

Another example is where the operator can specify a trajectory for robot manipulator 16 by teleoperation. The trajectory is then stored as parameters for a particular motion.

A substantial benefit of the flexibility of further development provided by telerobot control system 10 is that a relatively small set of preprogrammed task primitives, fully tested and qualified for use with remote task execution system 14, can later be utilized as necessary by altering the parameterization of the task primitives to meet the robot control requirements of a new poorly modeled environment and/or unplanned scenarios. The developments of such new instantiations of the preprogrammed task primitives, that is, task primitives with new parameterizations, can be performed without risk or unreasonable burden of prior training on the part of the operator.

In a typical use of telerobot control system 10, an operator is first trained on setup terminal 28 and then on simulation terminal 30 to perform teleoperation and parameterization of primitives for supervisory control, and then shared control using simulation by graphics simulator 38 as well as observation of local robot manipulator 40. New tasks, and/or modified tasks, may then be developed by such an operator without risk to the devices, such as remote task execution system 14, in the remote environment. Substantial testing of such new tasks or modification are thereby performed before actual operation of remote task execution system 14.

The result is that new tasks may be performed based on local development and testing of combinations of previous tasks, task primitives and teleoperation. In this way, remote task execution system 14 may be safely and successfully operated in a poorly modeled environment and/or to perform tasks required by unplanned scenarios, without the requirement that untested programming be used first upon remote task execution system 14.

Remote task execution system 14 includes communication and control system processor 24 to control robot manipulator 16 and provide a family of task execution primitives as well as an executive program resident therein. In space operations, for example, it is very important that the set of primitives in the remote location, such as a space vehicle, have been fully tested and are capable of being combined to perform all the tasks, planned or unplanned, before the original space vehicle launch.

While the particular family of task primitives will vary depending upon the application intended for each particular system, a family of such primitives will be described generally in order to facilitate an understanding of the present invention. I addition to the family of task primitives and executive task sequencing, remote task execution system 14 provides periodic task status, sensor position and other feedback information as well as command result information to operator interface 12 via communication link 18 and operator interface communication processor 34.

As described above, the task primitives include guarded and compliant motion primitives. The guarded motion primitives are provided in two forms.

The first form is a Cartesian guarded motion primitive which provides the ability to control motions using Cartesian coordinates including interpolated arm motion and stop on destination position or sensed force or torque thresholds. The inputs appropriate for this primitive include the designation of the specific robot manipulator to be used, selection of time or velocity as a basis for controlling motion and the magnitude thereof, force and torque thresholds, coordinate frames in which collision forces are to be sensed and in which Cartesian interpolation is to be performed, position destinations to go through and the period or rate at which status reports are to be provided to operator interface 12.

The second form for the guarded motion primitive is the joint guarded motion primitive in which joint interpolation is used instead of Cartesian interpolation. In this primitive, joint angles are used to specify destinations.

Another major task primitive is the move-to-touch primitive used to specify motion of a robot actuator, such as robot arm 20, with Cartesian interpolated motion until a specified destination is reached or until a force or torque threshold is exceeded. If the force or torque threshold is reached, then back off until below reverse thresholds, above safety thresholds, or return to initial position. Inputs include selection of the device to be actuated, the Cartesian destination, the frame in which to perform Cartesian interpolation, the forward, reverse and safety force and torque thresholds, the forward and reverse velocities and the status update rate.

Another major primitive is the generalized-compliant-motion or GCM primitive used for performing compliant motion tasks in Cartesian space. The required inputs include the selection of the robot actuator, the coordinate frame to be used for the destination, the frame to be used for interpolated motion, the frame to be used for control, selection of time or velocity based motion, selection of time or velocity for positional motion, position-force selection vector to select position and force degrees of freedom (DOF's) in the control frame, compliance selection vector to select which position DOF's also have compliance, force-compliance control gains, gains for virtual springs, force-torque and position-orientation thresholds, and ending conditions including a selection integer selecting which ending conditions to test for, such as maximum errors in position, orientation, force and torque and their rates of change.

The compliant grasp primitive closes the gripper fingers of end effector 21 while performing force control to control contact forces. Inputs include which actuator to be selected, gripper type such as pneumatic or served, selection of frame in which to do force control, force control gains and force control setpoints, and force-torque and position-orientation thresholds. A similar primitive is the free grasp primitive which simply opens or closes the gripper portion of end effector 21.

Another major task primitive provides force reflecting teleoperation.

Telerobot control system 10 provides a hierarchical menu system to guide the operator during description or development of a task from general motion types at the top of the hierarchy to specific motion types at the bottom of the hierarchy. The result is the specification of task primitives and their parameterization to perform the tasks desired by the operator. The operator need not know the specific task primitives to be used. Instead, the operator specifies a generic motion type, e.g. guarded motion, move to contact, compliant motion, force reflecting teleoperation, or grasp. A new menu then is provided with interaction germane to the specific motion type.

For example, if the operator specifies compliant motion, the compliant motion menu may present hinge, slide, screw, insert, level, push, translation, and similar options. The operator's selection of one of these options invokes a new menu with input selections pertaining only to that type of motion. The insert menu permits the operator to select the insertion direction, et cetera. The interactive hierarchical approach substantially reduces the number of decisions to be made by the operator at any one point in time while still permitting the development of a relatively complex, specific task.

Complex tasks may be developed by task sequencing, that is, selecting a sequence of tasks to be performed sequentially. Such sequences, together with specified parameters, may be utilized as macros to further reduce the complexity of task development. For example, the operator can specify a door opening motion by selection of the appropriate door opening motion from a menu. The task as actually executed is the GCM primitive with specific parameterization. The operator builds the macro by specifying the parameters for the task primitive and then saves the macro with a unique name, such as door-open, for future use. Several macros can be strung together to form a larger macro and saved under another name. A macro therefore becomes the programming equivalent of a command sequence.

One convenient feature of telerobot control system 10 useful during the development of parameterized sequences of task primitives is the ability to set positions, such as destinations, by use of simulation terminal 30. A mouse, or other hand input device such as hand controller 68, is used to move a cursor superimposed on the simulation presented on monitor 62 or on the actual video presented on monitor 42. Positioning the cursor on the actual or simulated image of a particular spot in the work environment can be used as a convenient way to establish the position of that spot as a destination or other parameter for a task primitive.

Both relative and absolute motion macros are useful. A relative motion macro has the same relative motion from its starting point as when taught, or learned, even though the absolute starting point changes. Relative motion macros are particularly useful for repetitive tasks executed relative to their environment, such as bolt turning and grasping. Absolute motion macros have an absolute position destination independent of where they start their motion. Such macros are useful for moving to an absolute position before beginning a relative motion sequence.

Relative motion macros may be executed with absolute positions, or other needed inputs, provided at the time of execution by means of a technique called run-time binding. Run-time binding binds parameters to the task execution primitives when they are being sent to be executed, both for direct commands and sequences. Some examples of run-time binding include setting the current reporting period parameter for the primitives and specifying the current position of video camera 22.

Shared control has components at both operator interface 12 and remote task execution system 14 so that communication must be done with both by the executive within operator interface 12 when executing shared control. The executive checks what the shared control mode is from the input parameters before sending the command to remote task execution system 14.

Run-time binding permits the development and use of a shared control macro where the mapping between the hand controller motion and robot motion is dependent on the position of video camera 22 without knowing where video camera 22 will be when the macro is executed. Run-time binding sets the actual camera arm position parameter when the macro is executed.

Sequence control stops execution of a sequence if the command result of a command of the sequence is not acceptable. Each primitive has a variety of possible command results. When building a macro, the acceptable command results are specifiable. A sequence executes by executing each command of the sequence and comparing the command result with the acceptable command results specified in the input parameters of the command. The next command is executed if the command result from the previous command is one of the acceptable command results.

Telerobot control system 10 Was configured for operation with various time delays between teleoperation and command inputs and task execution as would be encountered in certain environments, such as those encountered in space and undersea projects. The actual time delays encountered are, of course, the result of the actual delays present between remote task execution system 14 and operator interface 12 Which may change at unknown rates, To provide enhanced abilities to develop and simulate the operation of complex tasks in such environments, controllable variable delays, such as time delays 68 and 70, are provided in graphics simulator 38 and/or local robot manipulator 40, respectively.

While this invention has been described with reference to its presently preferred embodiment, its scope is not limited thereto. Rather, such scope is only limited insofar as defined by the following set of claims and includes all equivalents thereof.

What is claimed is:

1. A method of controlling a telerobot, comprising the steps of:

providing a set of autonomous local task primitives to control a local telerobot simulator, each of said autonomous local task primitives being a reusable, self contained program for controlling said local telerobot simulator to accomplish a local subtask in response to the numerical values of a series of local input parameters related to said autonomous local task primitive;

providing a related set of autonomous remote task primitives to control a remote telerobot manipulator, each of said autonomous remote task primitives being a reusable, self contained program for controlling said remote telerobot manipulator to accomplish a remote subtasks, related to a local subtasks, in response to the numerical values of a series of remote input parameters related to said autonomous remote task primitive;

interactively developing and modifying said series of numerical values for said local input parameters for each of local task primitives on the local telerobot simulator, to simulate the performance on the local telerobot simulator of a desired series of subtasks by the remote telerobot manipulator;

transferring a series of numerical values for said remote input parameters, and an order of execution of a sequence of autonomous remote task primitives, to said remote telerobot manipulator related to said interactively developed and modified numerical values and order of execution; and then executing a sequence of said remote task primitives in accordance with said transferred numerical values and order of execution to control the remote telerobot manipulator to perform said desired series of subtasks, whereby said remote telerobot manipulator may be controlled to perform a desired task consisting of said series of subtasks by the transfer of numerical values and an order of execution of said remote task primitives.

2. The method of claim 1, wherein the step of executing the sequence to control the remote telerobot manipulator further comprises:

modifying such execution by teleoperation to simultaneously merge automatic and manual control of the remote telerobot.

3. The method of claim 1, wherein the step of interactively developing and modifying further comprises the steps of:

interactively modifying and testing the numerical values for the local input parameters and the order of execution on a local graphics simulator; and then interactively modifying and testing the numerical values for the local input parameters and the order of execution on a local robot manipulator.

4. The method of claim 1, wherein the step of interactively developing and modifying further comprises the step of:

providing a time delay between task command and execution on the local robot simulator representing the delay expected between task command and execution on the remote telerobot manipulator.

5. The method of claim 1, wherein the step of interactively developing and modifying further comprises the steps of:

combining teleoperation of the local telerobot simulator with execution of a subset of said local task primitives on the local telerobot simulator to develop a macro task;

utilizing teleoperation of the local site simulator to indicate task primitives, their sequence, and their numerical parameterization to develop a macro task;

testing, editing and retesting the macro task on the local telerobot simulator; and then combining the pretested macro task with other local task primitives to develop the series of numerical values and order of execution.

6. The method of claim 1, wherein the step of executing the sequence of said remote task primitives to control the remote telerobot manipulator further comprises the step of:

modifying the parameters during execution.

7. The method of claim 1, wherein the step of executing the sequence of said remote task primitives to control the remote telerobot manipulator further comprises the step of:

modifying the parameters at the initiation of the execution of a remote task primitive based on task context at the time of said execution.

* * * * *